(12) United States Patent
Kim et al.

(10) Patent No.: US 8,479,855 B2
(45) Date of Patent: Jul. 9, 2013

(54) COOLING APPARATUS FOR VEHICLE

(75) Inventors: Jae Yeon Kim, Hwaseong-si (KR); Wan Je Cho, Suwon-si (KR); Su Whan Kim, Hwaseong-si (KR); Man Hee Park, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 74 days.

(21) Appl. No.: 13/189,246

(22) Filed: Jul. 22, 2011

(65) Prior Publication Data

US 2012/0085510 A1 Apr. 12, 2012

(30) Foreign Application Priority Data

Oct. 6, 2010 (KR) ........................ 10-2010-0097443

(51) Int. Cl.
*B60K 13/00* (2006.01)
(52) U.S. Cl.
USPC ................... 180/68.3; 180/68.4; 41/42; 41/44
(58) Field of Classification Search
USPC ..................... 165/41–44; 180/68.3, 68.4, 69.6
See application file for complete search history.

(56) References Cited

U.S. PATENT DOCUMENTS

| | | | |
|---|---|---|---|
| 5,269,367 A * | 12/1993 | Susa et al. | 165/41 |
| 6,450,275 B1 * | 9/2002 | Gabriel et al. | 180/65.23 |
| 6,651,761 B1 * | 11/2003 | Hrovat et al. | 429/442 |
| 7,051,787 B2 * | 5/2006 | Taguchi | 165/41 |
| 7,055,590 B2 * | 6/2006 | Hara | 165/202 |
| 7,147,038 B2 * | 12/2006 | Taguchi | 165/41 |
| 7,310,961 B2 * | 12/2007 | Hoshi et al. | 62/244 |
| 7,395,787 B1 * | 7/2008 | Claypole et al. | 123/41.01 |
| 7,451,844 B2 * | 11/2008 | Kunikata | 180/68.1 |
| 7,503,383 B2 * | 3/2009 | Yamaguchi et al. | 165/204 |

(Continued)

FOREIGN PATENT DOCUMENTS

| | | |
|---|---|---|
| JP | 2005-126029 A | 5/2005 |
| JP | 2007-186047 A | 7/2007 |
| JP | 2008-155739 A | 7/2008 |
| JP | 2009-154699 A | 7/2009 |

*Primary Examiner* — J. Allen Shriver, II
*Assistant Examiner* — Erez Gurari
(74) *Attorney, Agent, or Firm* — Morgan, Lewis & Bockius LLP (57) ABSTRACT

A cooling apparatus for a vehicle includes a cooling module connected to the cooling apparatus through a cooling line to cool a driving system. The cooling module includes, according to the amount of heat transfer and operation temperature, an aircon condenser disposed behind of a radiator grill. A radiator for an electromotive device is disposed in parallel under the aircon condenser behind of a bumper hole through which a large amount of outside air is introduced. A radiator for a stack is disposed behind of the aircon condenser, and a radiator for an electromotive device is disposed in parallel. A cooling fan is disposed behind of the radiator for a stack. The cooling apparatus includes an air guide unit mounted in front of the aircon condenser and the radiator for an electromotive device, the air guide unit preventing the bypassing of outside air introduced during operation of a vehicle while distributing and introducing the outside air. Accordingly, to improve the cooling performance of the cooling module, the aircon condenser and the radiator for an electromotive device are configured in parallel, and the radiator for a stack is disposed behind, according to the amount of heat transfer and operation temperature, so that outside air introduced from the outside of the vehicle is efficiently distributed and supplied and is then cooled, thus improving cooling efficiency and ensuring the cooling performance.

6 Claims, 5 Drawing Sheets

U.S. PATENT DOCUMENTS

| | | | |
|---|---|---|---|
| 7,520,320 B2 * | 4/2009 | Itoh et al. | 165/202 |
| 7,730,734 B2 * | 6/2010 | Hoshi et al. | 62/244 |
| 8,312,949 B2 * | 11/2012 | Hirukawa et al. | 180/68.1 |
| 2002/0040896 A1 * | 4/2002 | Ap | 219/208 |
| 2003/0192727 A1 * | 10/2003 | Mori et al. | 180/68.4 |
| 2005/0257563 A1 * | 11/2005 | Hoshi et al. | 62/507 |
| 2006/0096735 A1 * | 5/2006 | Taguchi | 165/41 |
| 2006/0196634 A1 * | 9/2006 | Sato et al. | 165/41 |
| 2006/0225441 A1 * | 10/2006 | Goenka et al. | 62/115 |
| 2007/0125514 A1 * | 6/2007 | Horn et al. | 165/42 |
| 2008/0202722 A1 * | 8/2008 | Feuerecker et al. | 165/41 |
| 2009/0183936 A1 * | 7/2009 | Kim et al. | 180/68.4 |
| 2009/0241573 A1 * | 10/2009 | Ikegami et al. | 62/238.7 |
| 2009/0266508 A1 * | 10/2009 | Furuta | 165/44 |
| 2012/0085510 A1 * | 4/2012 | Kim et al. | 165/44 |

* cited by examiner

COOLING APPARATUS FOR VEHICLE

CROSS-REFERENCE TO RELATED APPLICATION

This application claims priority to and the benefit of Korean Patent Application No. 10-2010-0097443 filed Oct. 6, 2010, the entire contents of which application is incorporated herein for all purposes by this reference.

BACKGROUND OF INVENTION

1. Field of Invention

The present invention relates to a cooling apparatus for a vehicle. More particularly, the present invention relates to a cooling apparatus for a vehicle, in which, in order to improve the cooling performance of a cooling module including an aircon condenser, a radiator for an electromotive device, a radiator for a stack, and a cooling fan, each constituent is disposed according to the amount of heat transfer and operation temperature, and outside air being introduced from the outside of a vehicle is efficiently supplied and cooled.

2. Description of Related Art

Of late, the growing interest in energy efficiency and environmental pollution has increased the demand for environmentally-friendly vehicles capable of substantially replacing internal combustion engine vehicles. In general, such environmentally-friendly vehicles are classified into electric vehicles driven by a fuel cell or electricity, or hybrid vehicles driven by an engine and an electric battery.

Here, as for the electric vehicle adopting a fuel cell, chemical reaction energy between oxygen and hydrogen is converted into electrical energy to thus generate driving torque. In this process, heat energy is generated by chemical reaction within the fuel cell, and this heat needs to be effectively removed in order to ensure the performance of the fuel cell.

Furthermore, even in the hybrid vehicle, driving torque is generated by driving a motor using a fuel cell or electricity supplied from an electric battery, together with an engine operated by general fuel. In this regard, the performance of the motor can be secured only when heat generated from the fuel cell, the battery and the motor is effectively removed.

Figure 1:
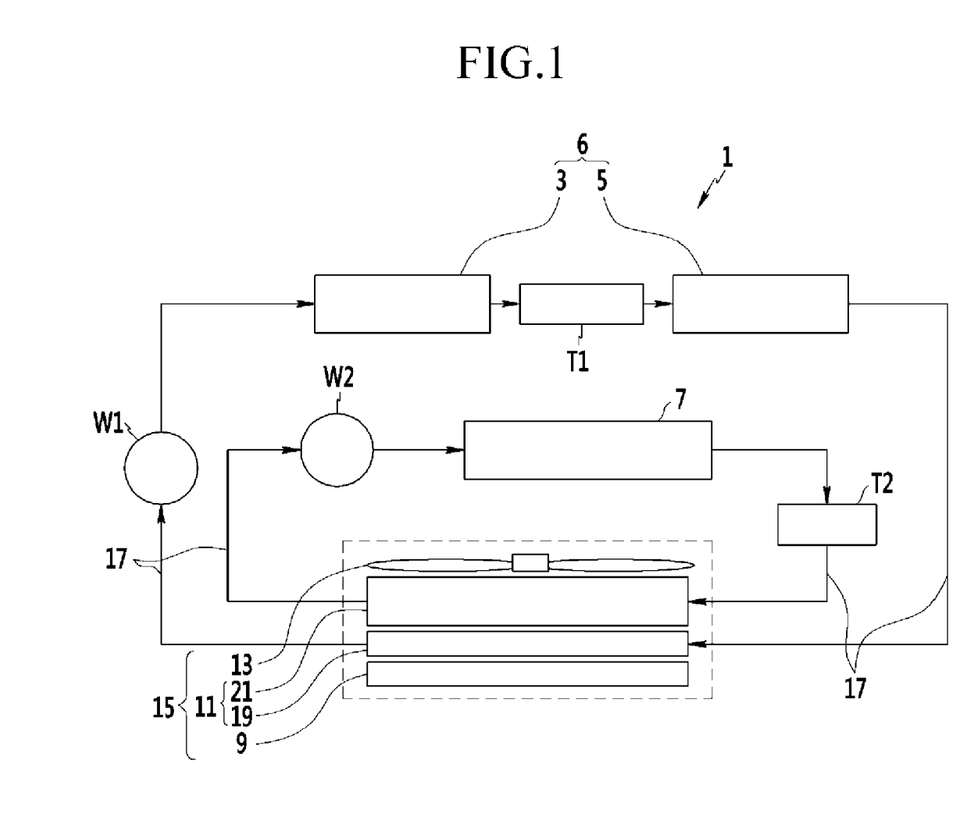
FIG. 1 is a block diagram of a cooling apparatus for a vehicle according to the conventional art.

FIG. 1 is a block diagram of a cooling apparatus for a vehicle according to the conventional art. A cooling apparatus 1 for a vehicle includes a coolant circulation system.

The cooling apparatus 1 for a vehicle according to the conventional art includes an electromotive device 6 including an inverter 3 and a motor 5, a cooling module 15 including an aircon condenser 9, a radiator 11, and a cooling fan 13 at the front side of a vehicle in order to cool a driving system configured as a fuel cell stack 7, a cooling line 17 connecting the cooling module 15 and the driving with each other, cooling pumps W1 and W2 circulating a coolant, and reservoir tanks T1 and T2 storing the coolant.

Here, the radiator 11 is configured separately into a radiator 19 for the electromotive device, and a radiator 21 for a stack, and is disposed between the aircon condenser 9 and the cooling fan 13.

The radiators 19 and 21 respectively supply coolants to the inverter 3 and the motor 5, and the fuel cell stack 7 by the operation of the respective water pumps W1 and W2. The supplied coolants are stored in the respective reservoir tanks T1 and T2 and then flow into the respective radiators 19 and 21. By repeating the above process, the coolants circulate to thus cool the driving system of the vehicle.

However, the radiator 19 for an electromotive device, and the radiator 21 for a stack, included in the cooling module 15, need to be separately manufactured and then applied to the conventional cooling apparatus 1 for a fuel cell vehicle, and the capacity of the radiator 21 for a stack needs to be high enough to ensure the cooling performance for the fuel cell stack 7. This complicates the construction of the cooling apparatus, makes it difficult to ensure the space for mounting each of the radiators 19 and 21, and increases manufacturing costs due to the individual production of each constituent.

Also, since the aircon condenser 9, the radiator 9 for an electromotive device, the radiator 21 for a stack, and the cooling fan 13, constituting the cooling module 15, are disposed in series, the outside air of a vehicle is introduced in a heated state while passing through the aircon condenser 9, and the wind speed is reduced by an increase in air resistance, thus deteriorating the cooling performance of each of the radiators 19 and 21.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a cooling apparatus for a vehicle having advantages of having a structure in which, according to the amount of heat transfer and operation temperature, an aircon condenser and a radiator for an electromotive device are disposed in parallel at the front side of a vehicle and a radiator for a stack is disposed at the back of the aircon condenser and the radiator for an electromotive device so as to improve the cooling performance of a cooling module, such that outside air introduced from the outside of the vehicle can be efficiently distributed and supplied and be cooled, thus ensuring the cooling performance.

Various aspects of the present invention provide a cooling apparatus for a vehicle, including a cooling module mounted at a front side of a vehicle and connected to the cooling apparatus through a cooling line to cool a driving system, the cooling module including an aircon condenser disposed at an upper side of the back of a radiator grill, a radiator for an electromotive device disposed in parallel under the aircon condenser at a lower side of the back of a bumper hole through which a large amount of outside air is introduced, and a radiator for a stack disposed at the back of the aircon condenser and the radiator for an electromotive device disposed in parallel, and a cooling fan disposed at the back of the radiator for a stack, according to the amount of heat transfer and operation temperature, and an air guide unit mounted in front of the aircon condenser and the radiator for an electromotive device, the air guide unit preventing bypass of outside air introduced during operation of a vehicle while distributing and introducing the outside air.

The air guide unit may include vertical air guide plates mounted at both sides in a length direction of the aircon condenser and the radiator for an electromotive device, respectively, and a horizontal air guide plate mounted in a horizontal direction between the aircon condenser and the radiator for an electromotive device and between vertical air guide plates.

The horizontal air guide plate may be mounted at a lower part of the aircon condenser or an upper part of the radiator for an electromotive device.

The air guide unit may further include an auxiliary guide plate mounted between the radiator for a stack, and the aircon condenser and the radiator for an electromotive device.

The cooling module may be provided to cool a coolant, for cooling an engine and an electromotive device in a hybrid vehicle, through heat exchange using outside air introduced from the outside of the vehicle.

The cooling module may be provided to cool a coolant, for cooling an electromotive device in an electric vehicle, through heat exchange using outside air introduced from the outside of the vehicle.

The cooling module may be provided to cool a coolant, for cooling an internal combustion engine in an internal combustion engine vehicle, through heat exchange using outside air introduced from the outside of the vehicle.

According to various aspects of the present invention, to improve the cooling performance of the cooling module, the aircon condenser and the radiator for an electromotive device are configured in parallel at the front side of the vehicle, and the radiator for a stack is disposed at the back of the aircon condenser and the radiator for an electromotive device, according to the amount of heat transfer and operation temperature, so that outside air introduced from the outside of the vehicle is efficiently distributed and supplied and is then cooled, thus improving cooling efficiency and ensuring sufficient cooling performance.

Furthermore, the air guide unit, preventing the bypassing of outside air having flowed into the front side of a vehicle in operation and simultaneously distributing the air, serves to distribute and supply the air to the aircon condenser and the radiator for an electromotive device. This serves to ensure cooling performance by increasing the amount of traveling wind, namely, outside air being supplied to the radiator for an electromotive device having a large amount of heat transfer to thus achieve size reduction, and sufficient space can be ensured in a small engine compartment, thus making it possible to simplify the layout.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
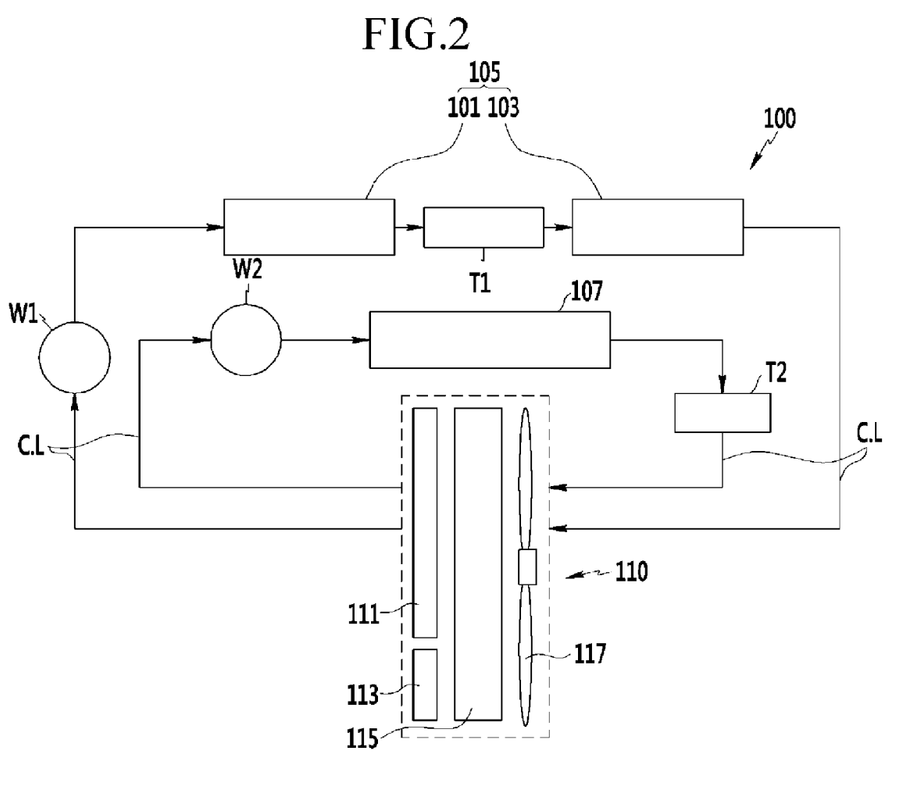
FIG. 2 is a block diagram of an exemplary cooling apparatus for a vehicle according to the present invention.

As shown in FIG. 2, a cooling apparatus 100 for a vehicle according to various embodiments of the present invention basically includes an electromotive device 105 including an inverter 101 and a motor 103, a cooling module 110 including an aircon condenser 111, a radiator 113 for an electromotive device, a radiator 115 for a stack, and a cooling fan 117 at the front side of a vehicle in order to cool a driving system including a fuel cell stack 107, a cooling line (C.L) connecting the cooling module 110 and the driving system with each other, cooling pumps W1 and W2 circulating coolants, reservoir tanks T1 and T2 storing the coolants.

Here, in the cooling apparatus 100 for a vehicle according to various embodiments of the present invention, the aircon condenser 111 and the radiator 113 for an electromotive device are configured in parallel at the front side of a vehicle, and the radiator 115 for a stack is disposed at the back of the aircon condenser 111 and the radiator 113, according to the amount of heat transfer and operation temperature to improve the cooling performance of the cooling module 110. Accordingly, outside air introduced from the outside of a vehicle is efficiently distributed and supplied and is then cooled, thus improving cooling efficiency and ensuring cooling performance.

Figure 3:
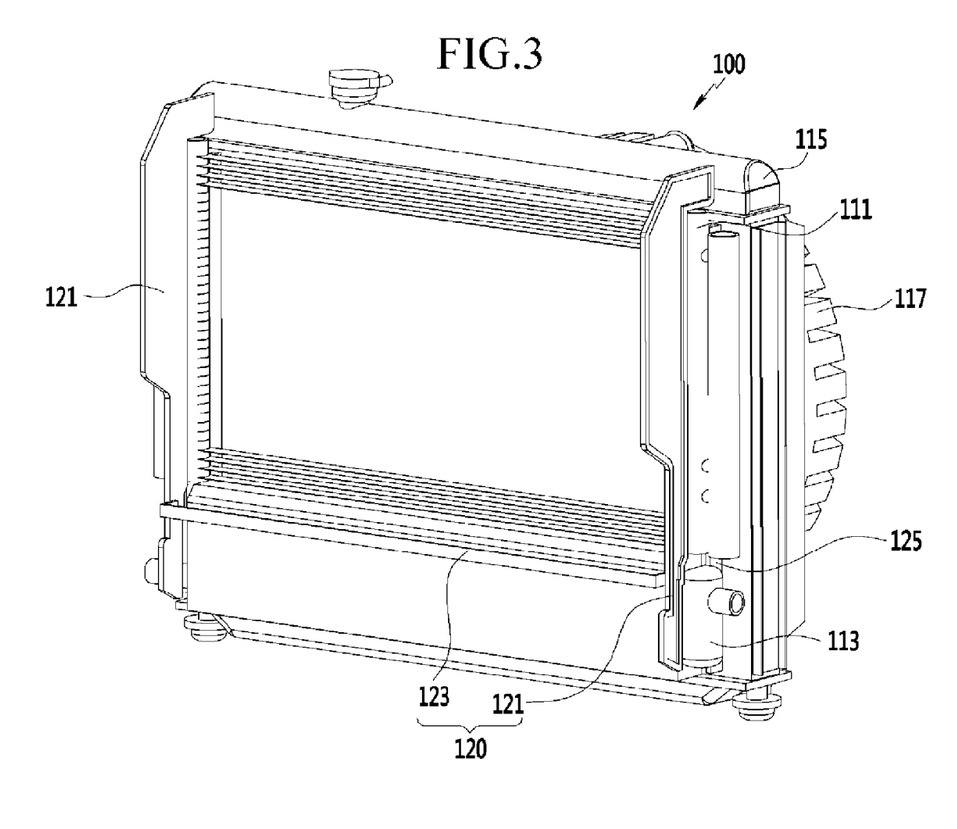
FIG. 3 is a perspective view illustrating an exemplary cooling module applied to the cooling apparatus for a vehicle, according to the present invention.
Figure 4:
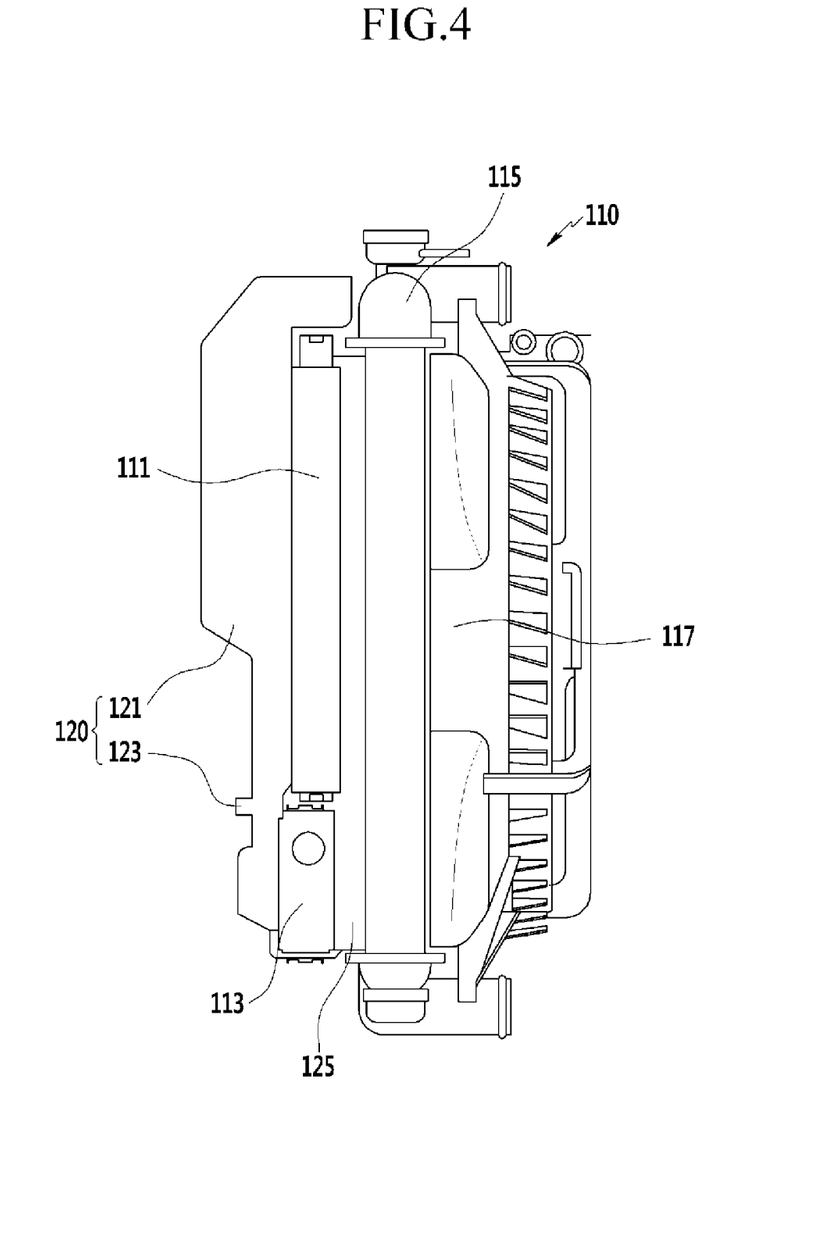
FIG. 4 is a side view of the cooling module applied to the cooling apparatus for a vehicle, according to the present invention.

To this end, as shown in FIGS. 3 and 4, in the cooling module 110 applied to the cooling apparatus 100 for a vehicle according to various embodiments of the present invention, the aircon condenser 111 is disposed at the upper side of the back of a vehicle radiator grill 102, and the radiator 113 for an electromotive device is disposed in parallel under the aircon condenser 111 at the lower side of the back of a bumper hole 104 where a large amount of air flows, depending on the amount of heat transfer and operation temperature.

Furthermore, in the cooling module 110, the radiator 115 for a stack is disposed at the back of the aircon condenser 111 and the radiator 113 for an electromotive device disposed in parallel, and the cooling fan 117 is disposed at the back of the radiator 115 for a stack.

The cooling module 110 configured as described above further includes an air guide unit 120 mounted to prevent the outside air (traveling wind), being introduced during the operation of a vehicle, from bypassing in front of the aircon condenser 111 and the radiator 113 for an electromotive device, and simultaneously to appropriately distribute the outside air according to the location of an outside-air inflow part and the ventilation resistance of the aircon condenser 111 and the radiator 113 for an electromotive device.

Herein, the air guide unit 120 includes vertical air guide plates 121, and a horizontal air guide plate 123, and each constituent thereof will now be described in more detail.

First, the vertical air guide plates 121 are mounted at both sides in the length direction of the aircon condenser 111 and the radiator 113 for an electromotive device.

The horizontal air guide plate 123 is mounted in a horizontal direction between the vertical guide plates 121 and between the aircon condenser 111 and the radiator 113 for an electromotive device.

Here, the horizontal air guide plate 123 may be mounted at the lower part of the aircon condenser 111 or the upper part of the radiator 113 for an electromotive device.

Furthermore, the air guide unit 120 may further include an auxiliary guide plate 125 mounted between the radiator 115 for a stack, and the aircon condenser 111 and the radiator 113 for an electromotive device so that the outside air having passed through the aircon condenser 111 and the radiator 113 for an electromotive device flows into the radiator 115 for a stack without being bypassed.

Figure 5:
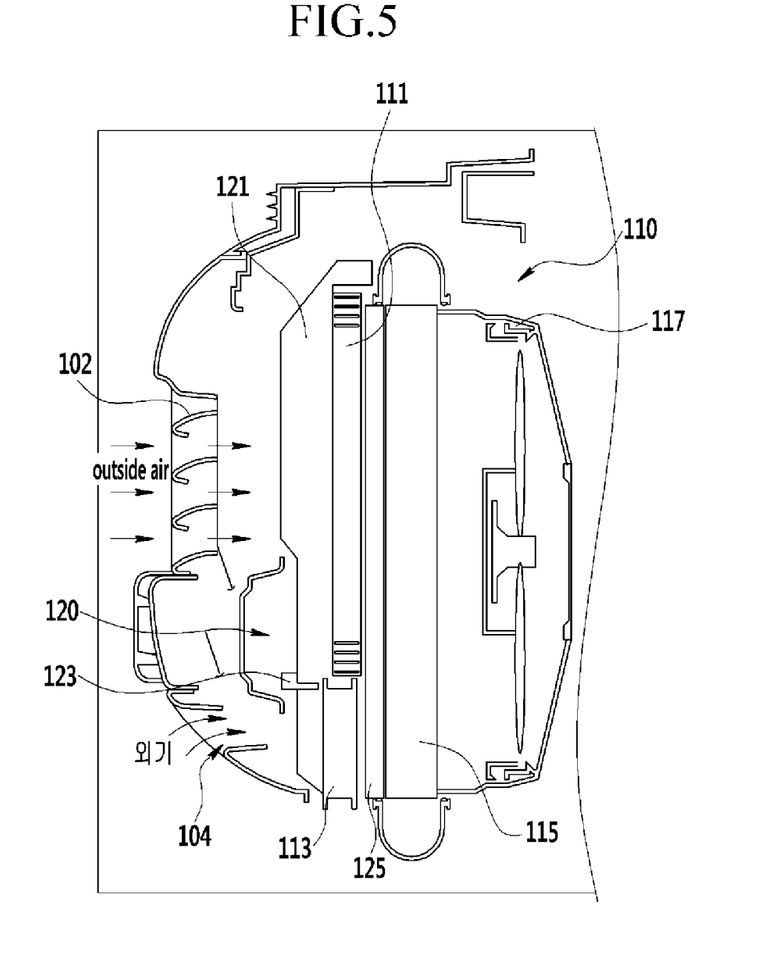
FIG. 5 is a view illustrating the usage state of the cooling module in a vehicle adopting the cooling apparatus for a vehicle according to the present invention.

That is, as shown in FIG. 5, when outside air is introduced through the radiator grill 102 and the bumper hole 104 while a vehicle is in operation, each of the vertical air guide plates 121 of the air guide unit 120 prevents the bypassing of the outside air, and the horizontal air guide plate 123 thereof serves to distribute a large amount of air, having flowed into the bumper hole 104, to the radiator 113 for an electromotive device and supply the air.

Meanwhile, the cooling module 110 configured as described above according to various embodiments of the present invention may be used to cool a coolant, cooling an engine and an electromotive device in a hybrid vehicle, through heat exchange using outside air introduced from the outside of a vehicle.

That is, a cooling module in a hybrid vehicle includes an aircon condenser disposed at the upper side of the back of a radiator grill, a radiator for an electromotive device disposed in parallel under the aircon condenser, a radiator for an internal combustion engine disposed at the back of the aircon condenser and the radiator for an electromotive device disposed in parallel, and a cooling fan disposed at the back of the radiator for an internal combustion engine, and the above air guide unit 120 may be mounted in front of the airco condenser and the radiator for an electromotive device.

Furthermore, the cooling module 110 according to various embodiments of the present invention may be provided to cool a coolant for cooling an electromotive device in an electric vehicle through heat exchange using outside air introduced from the outside of a vehicle.

That is, the cooling module in an electric vehicle includes an aircon condenser disposed at the upper side of the back of a radiator grill, a radiator for an electromotive device disposed in parallel under the aircon condenser, and a cooling fan disposed at the back of the aircon condenser and the radiator for an electromotive device disposed in a parallel structure.

The cooling module 110 according to various embodiments of the present invention may be provided to cool a coolant for cooling an engine in an internal combustion engine vehicle through heat exchange using outside air introduced from the outside of a vehicle.

That is, the cooling module in an internal combustion engine vehicle includes an aircon condenser disposed at one side or upper side of the back of a radiator grill, a radiator for an internal combustion engine disposed in parallel under the aircon condenser or in series at the other side thereof, and a cooling fan disposed at the back of the aircon condenser and the radiator for an internal combustion engine. The above-described air guide unit 120 may be mounted in front of the aircon condenser and the radiator for an internal combustion engine.

As described above, the cooling apparatus 100 for a vehicle according is applicable to not only a fuel cell vehicle but also a hybrid vehicle, an electric vehicle and an internal combustion engine vehicle.

Accordingly, when the cooling apparatus for a vehicle according to various embodiments of the present invention is utilized, the aircon condenser 111 and the radiator 113 for an electromotive device are formed in parallel at the front side of a vehicle, and the radiator 115 for a stack is disposed at the back of the aircon condenser 111 and the radiator 113 for an electromotive device, according to the amount of heat transfer and operation temperature in order to improve the cooling performance of the cooling module 110. In such a way, outside air introduced from the outside of a vehicle is efficiently distributed and supplied and is then cooled, thus improving cooling efficiency and ensuring cooling performance.

Furthermore, the air guide unit 120, preventing the bypassing of outside air flowing into the front side of a vehicle in operation and simultaneously distributing the air, serves to distribute and supply the air to the aircon condenser 111 and the radiator 113 for an electromotive device. This serves to ensure cooling performance by increasing the amount of traveling wind, outside air being supplied to the radiator for an electromotive device having a large amount of electric heat, and to allow for size reduction. Due to the parallel structure, enough mounting space can be ensured in a small engine compartment, thus making it possible to simplify the layout.

For convenience in explanation and accurate definition in the appended claims, the terms upper or lower, front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooling apparatus for a vehicle comprising:
   a cooling module mounted at a front side of the vehicle and connected to a cooling apparatus through a cooling line to cool a driving system, the cooling module including an aircon condenser disposed at an upper back side of a radiator grill, a radiator for an electromotive device disposed in parallel under the aircon condenser at a lower back side of a bumper hole through which a outside air is introduced, and a radiator for a stack disposed behind the aircon condenser and the radiator for an electromotive device disposed in parallel, and a cooling fan disposed behind the radiator for a stack, according to the amount of heat transfer and operation temperature; and
   an air guide unit mounted in front of the aircon condenser and the radiator for an electromotive device, the air guide unit preventing bypass of outside air introduced during operation of a vehicle while distributing and introducing the outside air;
   wherein the air guide unit comprises:
      vertical air guide plates mounted along opposing sides in a length direction of the aircon condenser and the radiator for an electromotive device, respectively; and
      a horizontal air guide plate mounted in a horizontal direction between the aircon condenser and the radiator for an electromotive device and between vertical air guide plates.

2. The cooling apparatus of claim 1, wherein the horizontal air guide plate is mounted at a lower part of the aircon condenser or an upper part of the radiator for an electromotive device.

3. The cooling apparatus of claim 1, wherein the air guide unit further comprises an auxiliary guide plate mounted between the radiator for a stack, and the aircon condenser and the radiator for an electromotive device.

4. The cooling apparatus of claim 1, wherein the cooling module is provided to cool a coolant, for cooling an engine and an electromotive device in a hybrid vehicle, through heat exchange using outside air introduced from the outside of the vehicle.

5. The cooling apparatus of claim 1, wherein the cooling module is provided to cool a coolant, for cooling an electromotive device in an electric vehicle, through heat exchange using outside air introduced from the outside of the vehicle.

6. The cooling apparatus of claim 1, wherein the cooling module is provided to cool a coolant, for cooling an internal combustion engine in an internal combustion engine vehicle, through heat exchange using outside air introduced from the outside of the vehicle.

* * * * *